Patented Feb. 13, 1951

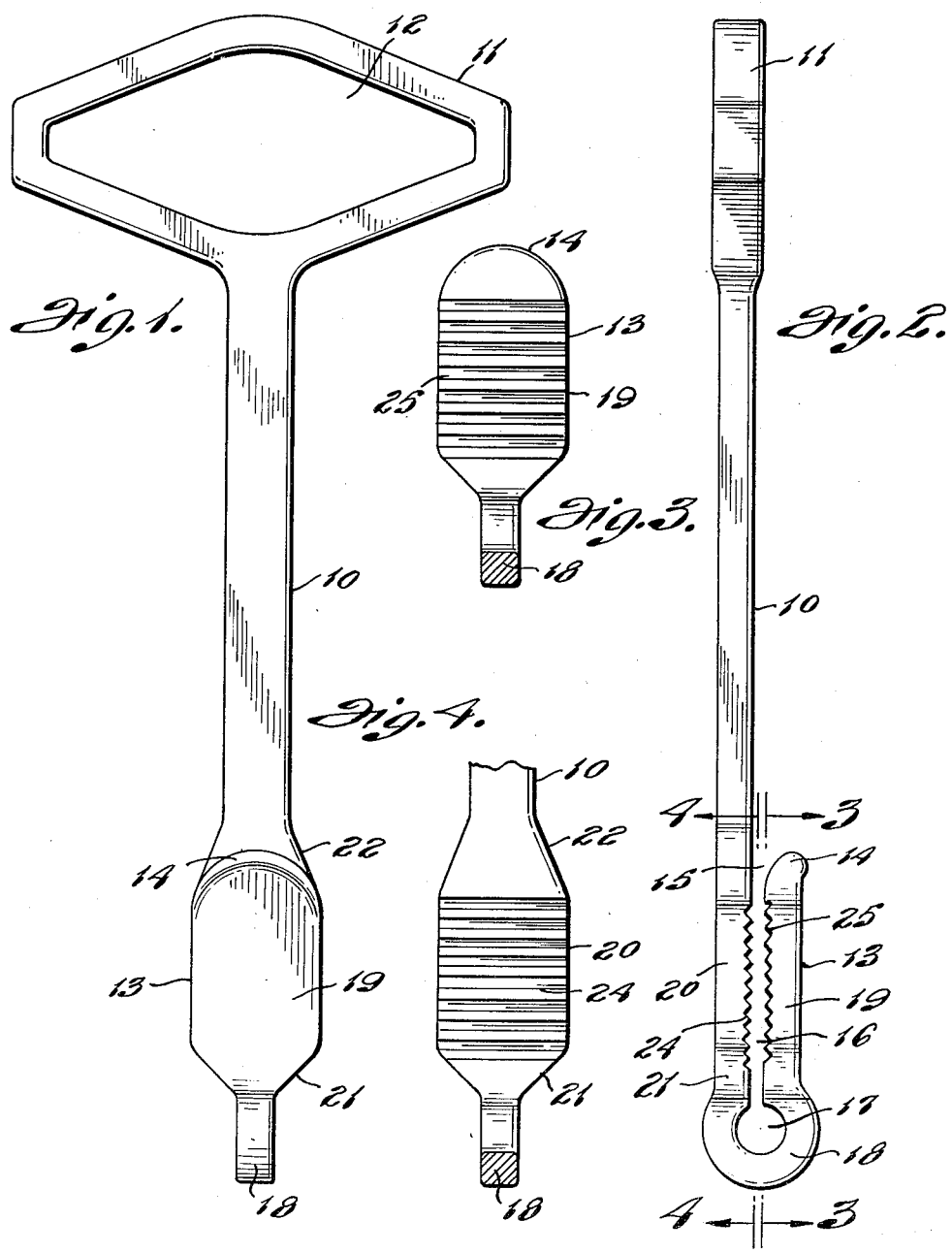

2,541,331

UNITED STATES PATENT OFFICE 2,541,331

FISHHOOK REMOVER

John P. Boyd, Forest Hills, N. Y.

Application July 23, 1947, Serial No. 763,072

1 Claim. (Cl. 43—53.5)

This invention relates to a fish hook remover.

The invention comprehends a fish hook remover for expeditiously removing barbed fish hooks from the mouths of fish without damaging the hooks or unduly harming the mouths of the fish and without touching the fish by hand to thereby avoid possible cuts from the fish's fins and teeth.

Another object of the invention is the provision of a fish hook remover which is adapted for removing the hooks from the mouths of fish by holding the fishing line in one hand and utilizing the other hand to reave the remover onto the line and hook and then by rocking action loosening the hook so that the fish may be readily flipped from the hook.

Another object of the invention is the provision of means for retaining the hook in engagement with the remover during the loosening operation.

With the foregoing and other objects in view, reference is now made to the following specification and accompanying drawings in which the preferred embodiment of the invention is illustrated.

In the drawings:

Fig. 1 is a view in elevation of a fish hook remover constructed in accordance with the invention.

Fig. 2 is a side view thereof.

Fig. 3 is a fragmentary sectional view taken approximately on line 3—3 of Fig. 2.

Fig. 4 is a similar view taken approximately on line 4—4 of Fig. 2.

Referring to the drawings by characters of reference, the fish hook remover is in the form of a hand tool which permits of the convenient grasping of the same for imparting rocking movement to the hook when caught in a fish's mouth.

The remover consists of an elongated shank 10 provided with a handle 11 at one end thereof which handle is preferably of oval formation in plan extending laterally outward beyond the shank and formed with an opening 12 for receiving the fingers for firmly gripping the handle. At the opposite end from the handle the shank 10 is rebent to provide an overlying rearwardly directed free end portion 13 disposed parallel with the shank and with the outwardly flared terminal 14 providing an enlarged entrance mouth 15 leading to a narrow passageway 16 between the rearwardly projecting free end 13 and the oppositely disposed forward end portion of the shank 10. The inner end of the passageway 16 terminates in an enlarged opening or eye 17 formed by the rebent end 18.

The rearwardly directed free end 13 and the confronting portion of the shank 10 are provided with widened portions 19 and 20 which merge with the rebent end 18 by truncated portions 21, while the widened portion 20 merges with the shank 10 by a truncated portion 22.

Constructed in this manner, the handle 11 being relatively wider than the shank 10 provides a leverage for rocking the shank while the widened portions 19 and 20 transmit the rocking action to the hook when engaged in the passageway 16 therebetween. The rebent end 18 is reduced in width so that the same may be thrust deep into the mouth of the fish if the hook has been swallowed or caught deeply. The confronting faces of the widened portions 19 and 20 are formed with transversely extending V-shaped serrations 24 and 25 respectively arranged with the ridges and depressions of one face thereof disposed in confronting relation respectively with the ridges and depressions of the other face.

In using the remover for freeing a hook from the mouth of a fish, the fishing line is held in one hand with the fish depending from the hook. The remover is held in the other hand and is hooked onto the line through the passageway 16 to dispose the line in the eye 17 thereof. The remover is then moved down the line and over the shank of the hook so as to dispose the rebent end 18 in the mouth of the fish. The remover is then moved forwardly until the shank of the hook engages the serrated faces 24 and 25 of the widened portions 19 and 20. The serrations hold the hook in position therebetween and by rocking the remover back and forth about the shank 10 as an axis the hook will be loosened. The remover is then raised to a level with the hand holding the line and by a flip of the remover the fish will be ejected from the hook. Before flipping the fish from the hook, the remover is pulled forwardly to dispose the shank of the hook in the eye 17. In removing large fish from the hook with the aid of the remover, it is necessary to exert a forward pull on the remover since the hooks are large and are usually caught deep in the mouth of the fish.

What is claimed is:

A fish hook remover including a straight shank, a handle at one end of said shank projecting laterally outward beyond the shank to provide leverage for turning the shank, a curved portion at the opposite end of said shank terminating in a widened free end portion extending rearwardly from its curved portion in parallel relation with the longitudinal axis of the shank, said shank having a widened portion corresponding to the length and width of said free end portion and disposed in narrowly spaced parallel relation therewith so as to provide a narrow passageway between said widened portions with an entrance mouth at the rear of said free end portion for receiving and retaining the shank of a fish hook between said widened portions so as to impart a rocking action to the fish hook by rocking the remover about its shank as an axis to effect loosening of the fish hook from the mouth of a fish, and said curved portion being relatively narrower than said widened portions and providing an enlarged eye at the inner end of said passageway.

JOHN P. BOYD.

REFERENCES CITED

The following references are of record in the file of this patent:

UNITED STATES PATENTS

| Number | Name | Date |
|---|---|---|
| 774,900 | Wilson | Nov. 15, 1904 |
| 1,043,627 | Risdon | Nov. 5, 1912 |
| 2,176,330 | De Beuckelaere | Oct. 17, 1939 |
| 2,289,767 | Ford | July 14, 1942 |